Figure 1:
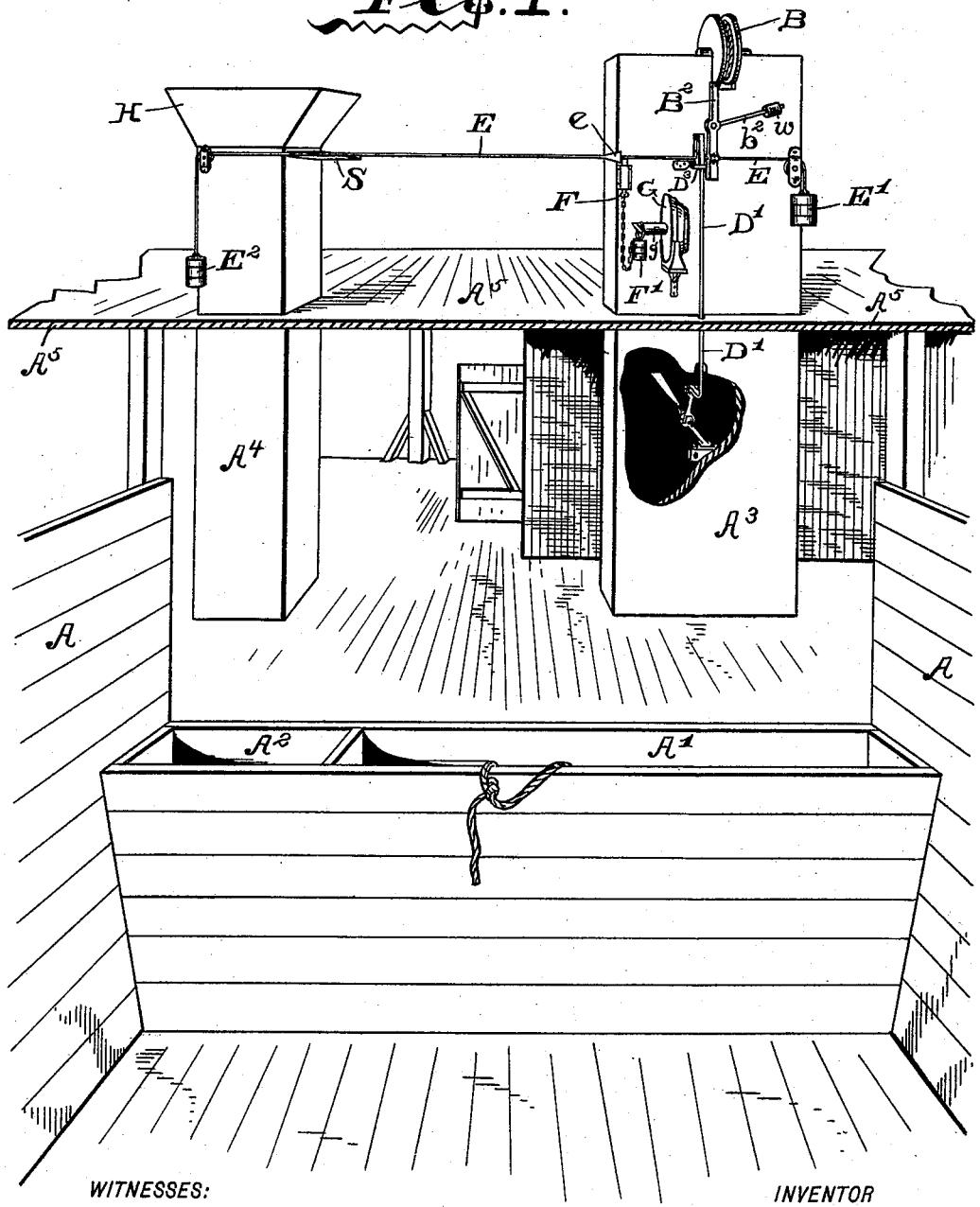

(No Model.) 2 Sheets—Sheet 2.
J. A. MICHAEL.
TIME FEEDER FOR ANIMALS.
No. 523,405. Patented July 24, 1894.
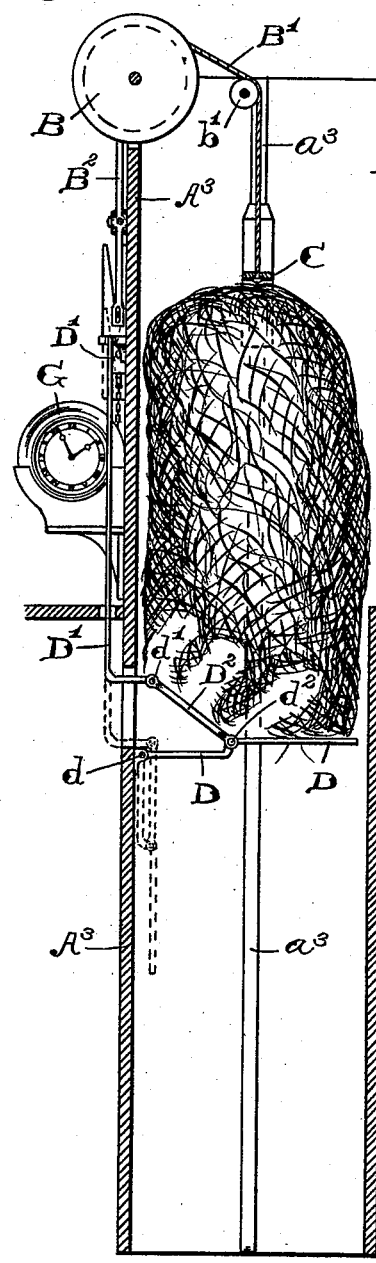
Fig. 2.
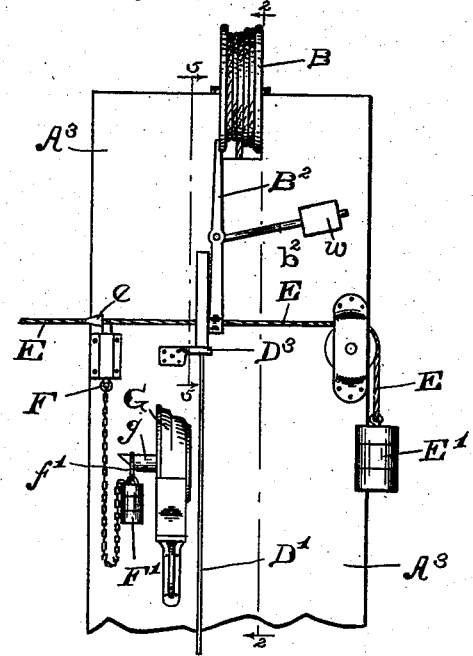
Fig. 3.
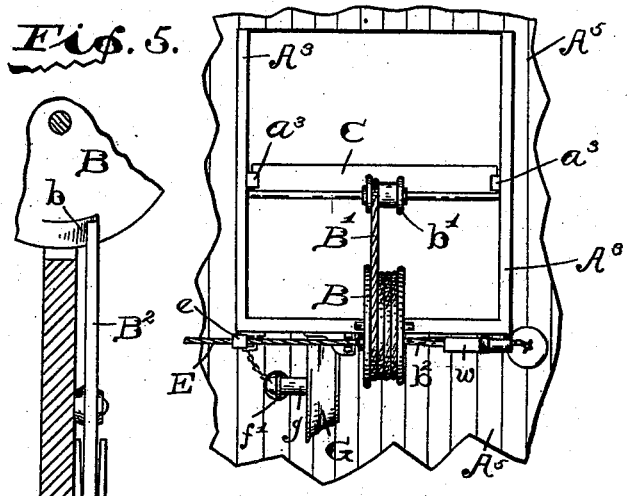
Fig. 4.
Fig. 5.
WITNESSES:
F. W. Warner.
J. A. Walsh
INVENTOR
Jacob A. Michael,
BY
Chester Bradford
ATTORNEY.

UNITED STATES PATENT OFFICE.

JACOB A. MICHAEL, OF DAYTON, OHIO.

TIME FEEDER FOR ANIMALS.

SPECIFICATION forming part of Letters Patent No. 523,405, dated July 24, 1894.

Application filed May 16, 1893. Serial No. 474,423. (No model.)

*To all whom it may concern:*

Be it known that I, JACOB A. MICHAEL, a citizen of the United States, residing at Dayton, in the county of Montgomery and State of Ohio, have invented certain new and useful Improvements in Time Stock-Feeders, of which the following is a specification.

The object of my said invention is to produce a device whereby hay or grain or both may be automatically fed to stock at predetermined times.

It consists in the combination with certain feeding mechanism, of a clock arrangement, and in certain details of construction and arrangements of parts, all as will be hereinafter more particularly described and claimed.

Referring to the accompanying drawings, which are made a part hereof, and on which similar letters of reference indicate similar parts, Figure 1 is a perspective view illustrating my invention in use; Fig. 2 a vertical sectional view as seen from the dotted line 2 2 in Fig. 3, but extending throughout the entire length of the feeding tube or chute; Fig. 3 a detail side elevation on a somewhat larger scale, showing a portion of the mechanism shown in Fig. 1 more plainly; Fig. 4 a top or plan view, and Fig. 5 a detail sectional view on a still further enlarged scale, as seen from the dotted line 5 5 in Fig. 3.

In Fig. 1 is shown in perspective the interior of a stall A having the usual hay box $A'$ and grain box $A^2$ for feeding, with a hay chute $A^3$ and grain chute $A^4$ extending down from the upper floor $A^5$, all in an ordinary and well known manner. Mounted upon the top of the hay chute $A^3$ is a wheel B having a rope $B'$ secured thereon, and this rope extends, over a sheave $b'$ or otherwise, to a weighted cross-bar C. Said weighted cross-bar is mounted on slides $a^3$ within the hay chute $A^3$, and, when the mechanism is set, occupies a position near the upper end of said hay chute;—which is preferably open on the rear side down to the level of the floor $A^5$, so that hay may be pushed into it, below said weighted cross-bar, from said floor. The wheel B has a notch $b$ in one side (see Fig. 5) with which a latch $B^2$ is adapted to engage, as will be presently more fully described, and whereby said wheel is held in position, until said catch is disengaged, and the weighted bar C thus held suspended above the hay. An arm $b^2$ having a weight $w$ holds the latch $B^2$ into engagement with its notch until forcibly disengaged.

A pivoted arm D extends in centrally across the hay chute $A^3$, as shown most plainly in Fig. 2, and is secured by a pivot $d$ to a bearing on the inner side of said chute. When the parts are in raised position, this bar is held up by a rod $D'$ and a link $D^2$ connecting said arm and said rod, the attachment being made by means of pivots $d'$ $d^2$. The pivot points are so located relatively to each other, that when the arm is dropped, they will occupy the positions shown by the dotted lines in said Fig. 2. The rod $D'$ extends up, as shown most plainly in Figs. 1 and 3, and, when the mechanism is set, rests upon and is supported by a bracket $D^3$ secured upon the side of the hay chute $A^3$. This bracket is forked or bifurcated, and a portion of the rod $D'$ which extends above said bracket is enlarged, and thus rests on top thereof, and is also bifurcated and passes astride the rope E. When the rope is operated, as will be presently described, it pulls this rod $D'$ off the bracket $D^3$, letting it drop, when the arm D and the parts immediately connected thereto, will assume the position shown by the dotted lines in Fig. 2, thus leaving the chute unobstructed, and permitting the hay to fall. As the rod $D'$ is pulled off the bracket, it also pushes the latch $B^2$, disengaging it from the notch in the side of the wheel B, which is thus permitted to revolve, allowing the rope $B'$ to unwind, and the weighted bar C to descend, which, being on top of the hay, forces it down, in case it should be inclined to stick in the hay chute.

The rope E extends across from one chute to the other, and carries a heavy weight $E'$ upon one end, and preferably a lighter weight $E^2$ upon the other end. It carries a catch $e$ also, which is adapted to engage with a trigger bolt F. When the device is used to operate two chutes, this rope is attached to a slide S which forms the bottom of a hopper, H, at the top and forming a continuation of the grain chute $A^4$. When this attachment is made, the slide S needs to travel farther in being opened, than the movement of the rod $D'$ in being dislodged from the bracket $D^3$.

The trigger bolt, therefore, is placed a sufficient distance from said rod D' to permit of this movement. The operation is, when the trigger bolt is withdrawn, that the weight E' will pull the rope E, opening the slide S, and when the catch e comes in contact with the upper end of the rod D', will simultaneously dislodge said rod from the bracket D³, permitting the arm D to swing down, and swing the catch B² on its pivot releasing the wheel B, and permitting the weighted bar C to descend. The descent of the weights is limited by suitable stops or rests, which may be the floor A⁵.

The trigger bolt F is an ordinary chain bolt, and is preferably operated by means of a weight F', which is normally suspended, but which is adapted to be precipitated at a predetermined time, withdrawing the trigger bolt from engagement with the catch e on the rope, and permitting the operation of the mechanism.

The means of precipitating the weight F' is an attachment to a clock, G, which may be of the ordinary alarm clock variety. Extending out from the rear of this clock, and attached to the mechanism therein, is a stem g. This stem is tapered at the end, and its flat and normally upper side may, if desired, be notched to receive the ring f' of the weight F'. When, by means of the mechanism, this stem is revolved, and the tapered side turned up, the ring f' will slip off, permitting the weight F' to drop, thus withdrawing the catch-bolt F, with the result already described. The clock mechanism being of a simple, ordinary and well known character, will not be shown or further described, it being sufficient to say, that the clock is set and otherwise manipulated in the same manner as an ordinary alarm clock, and that when the predetermined time has arrived, the mechanism will operate in the usual and well known manner, and revolve the stem g.

Having thus fully described my said invention, what I claim as new, and desire to secure by Letters Patent, is—

1. The combination, in an automatic feeder for animals, of a hay chute A³, the supporting arm D therein, the supporting rod and link to said arm, a bracket supporting said rod, and a trigger and clock mechanism whereby said rod is automatically disengaged and said arm permitted to fall, substantially as set forth.

2. The combination, in an automatic feeder for animals, of a hay chute, a weighted bar mounted on slides in said chute near its upper end, a wheel also mounted on said hay chute and connected to said weighted bar by means of a rope, a notch in said wheel, a pivoted catch engaging with said notch, and a trigger and clock mechanism whereby said catch may be disengaged, and said weighted bar thus permitted to descend, substantially as set forth.

3. The combination, in an automatic feeder for animals, of mechanism for retaining the hay or feed, a weighted rope having a catch adapted to come in contact with and operate said mechanism, and a trigger and clock mechanism and connections between the clock mechanism and the trigger whereby the latter will be disengaged from said catch and permit said rope to operate, substantially as set forth.

4. The combination, in an automatic feeder for animals, of a hay chute having mechanism to sustain and afterward permit the hay to descend, a grain chute having a slide to sustain and afterward permit the grain to descend, a rope extending across both and attached to said slide, and a catch on said rope positioned a sufficient distance from the mechanism to permit said slide to be withdrawn by the rope before said catch comes in contact with the mechanism, substantially as shown and described.

5. The combination, in a time stock feeder, of the feeding mechanism, a rope running transversely across the structure and supported by sheaves, and carrying weights at both ends, one of said weights being heavier than the other, a catch e on said rope, a trigger-bolt F secured to the structure in the path of the rope, a clock mechanism, a spindle thereto carrying a weight attached to said bolt by a slack rope or chain and adapted to precipitate said weight at a predetermined time and withdraw said bolt, substantially as shown and described.

6. The combination, in a time stock feeder, of the feeding mechanism, a rope running transversely across the structure, operating weights attached thereto, a catch e secured upon the body portion of the rope between the two points where it is supported, a spring trigger-bolt secured to the structure in the path of said catch, a clock mechanism, and a connection between said clock mechanism and said spring trigger-bolt, whereby at a predetermined time said bolt may be withdrawn and the feeding mechanism thus operated, substantially as shown and described.

In witness whereof I have hereunto set my hand and seal, at Indianapolis, Indiana, this 11th day of May, A. D. 1893.

JACOB A. MICHAEL. [L. S.]

Witnesses:
CHESTER BRADFORD,
JAMES A. WALSH.